Patented Sept. 1, 1942

2,294,402

UNITED STATES PATENT OFFICE 2,294,402

PYROLYSIS OF METHYL VINYL ETHER

Rudolph Leonard Hasche and Benjamin Thompson, Kingsport, Tenn., assignors to Eastman Kodak Company, Rochester, N. Y., a corporation of New Jersey No Drawing. Application February 11, 1939, Serial No. 255,933

11 Claims. (Cl. 260—601)

This invention relates to the manufacture of aliphatic aldehydes containing 3 or more carbon atoms and more particularly to aliphatic aldehydes containing an odd number of carbon atoms in the molecule, such as for example, propionaldehyde.

Aldehydes containing 3 or more carbon atoms have a large number of uses in the industry. These various aldehydes may be converted to aliphatic acids for use in cellulose ester manufacture. Or, the various aldehydes may be used in polymerization and/or condensation reactions or for various other purposes. The production of odd numbered carbon atom aliphatic aldehydes is rather limited inasmuch as certain materials previously employed for manufacturing such products are not particularly plentiful. Therefore, it is highly desirable that processes be developed for manufacturing such aldehydes from raw materials which are more plentiful or which may be produced from readily obtainable materials. We have developed a method for producing aldehydes containing at least 3 carbon atoms, which may be carried out on readily available or producible chemical compounds.

This invention has for one object to provide a process for the manufacture of aliphatic aldehydes containing at least 3 carbon atoms. Still another object is to provide a process for producing aliphatic aldehydes containing an odd number of carbon atoms in the molecule. A still further object is to provide a method for the manufacture of aliphatic aldehydes from unsaturated ethers. Another object is to provide a process for pyrolyzing vinyl ethers. Still another object is to provide a process for the pyrolysis of ethers which may be carried out with great rapidity. A still further object is to provide a process for the manufacture of propionaldehyde. Still another object is to provide a process for the pyrolysis of ethers such as methyl, propyl and amyl vinyl ethers. A still further object is to provide a process in which heat is the principal item of operation. Other objects will appear hereinafter.

We have found that if vinyl ethers are heated to a sufficiently high temperature at a sufficiently high space velocity, rearrangement or transformation of the ether involving the shift of an entire alkyl radical will be caused to take place to produce an aliphatic aldehyde therefrom. The vinyl ethers which may be used in our process may be obtained from various sources. For example, the methyl vinyl ether with which our invention is particularly concerned may readily be produced by reacting compounds such as acetylene and methanol in the presence of an alkaline catalyst. This ether as well as various other ethers, such as the propyl and amyl vinyl ethers, may be produced by similar or other methods and employed in our process.

The prior art has dealt with a different type of isomerization, that of unsaturated alcohols containing a tertiary carbon atom and symmetrical ethers of these alcohols. The prior art has not dealt with vinyl ethers but only with di-isobutenyl and other unsaturated ethers. The fundamental difference is that the mechanism of the isomerization is different and the prior art isomerization takes place by the migration of two hydrogen atoms, one from one carbon atom to another and the other from an oxygen atom to a carbon bond; while in our invention an entire alkyl radical shifts from union with an oxygen atom to form a carbon to carbon bond.

In order to further illustrate our invention, reference will now be made to the manufacture of propionaldehyde from methyl vinyl ether. While we have set forth this application of our process in some detail, inasmuch as it represents our preferred embodiment, it is to be understood that the material is set forth primarily for the purposes of illustrating our process and is not to be construed as limiting our invention.

In this particular example, methyl vinyl ether was treated. The methyl vinyl ether was produced by reacting acetylene and methanol in the presence of sodium hydroxide. However, methyl vinyl ether from some other source could be employed in our process.

The methyl vinyl ether was passed through a reaction tube (in this instance without a catalyst) at a temperature above 400° C. and preferably at a space velocity high enough such that less than a third of the ether is converted to other products while a substantial body of the ether is recovered unreacted. Thus at 600° C. a space velocity of 20,000 could be used. The required space velocity varies with the temperature of the reaction being lower for lower temperatures and much higher for temperatures in the 800° to 900° C. range. We have found that under certain ranges of temperature-space velocity relation, where only a small part of the ether reacts per pass, a particularly good conversion to propionaldehyde is obtained. In general space velocities between about 1,000 and 25,000 may be employed in the operation of our process, the aforesaid value of 20,000 merely being an illustration of the space velocity preferred at the temperature indicated.

In carrying out the above reaction an inert diluent such as steam, mercury vapor or inert gas can be used. Under certain conditions of temperature and space velocity the use of a diluent is found to be desirable in preventing side reactions from taking place. The yield of saturated aldehyde produced may also be improved by recirculating with the vinyl ether feed, gaseous products such as methane, carbon monoxide and, or, other by-products.

For example, in the pyrolysis of methyl vinyl ether, in addition to the reaction of isomerication to propionaldehyde, certain other reactions take place forming by-products. If, as indicated, an equilibrium amount of the by-products, or any particular one of the by-products is recirculated the yield of propionaldehyde is considerably improved.

In place of using a diluent or an equivalent thereto, the above pyrolysis may be carried out at reduced pressure, that is below atmospheric, other variables, as temperature and space velocity, being adjusted so that the desired amount of pyrolysis occurs.

The above pyrolysis may also be carried out under moderate pressures such as 100 or 200 lbs. gauge. This method of operation is of value in that it permits more economical recovery of the ether and products, and lowers refrigeration costs incidental to carrying out the reaction. By the use of pressure in the 150–200# range the boiling point of methyl vinyl ether is raised from 7° C. to temperatures such that, for example, river water may be used to condense it. In carrying out the pyrolysis under pressure the temperature-space velocity relation would be such that less than ½ of the ether would react per pass through the furnace.

From the preceding, it is apparent that we have described a particularly useful way for preparing aliphatic aldehydes from vinyl ether, inasmuch as the process resolves itself to a straight pyrolysis at a high temperature and high space velocity. The materials which may be employed in our process, as already indicated, may be obtained from raw materials that are more or less plentiful and readily available.

While in the aforementioned example the rearrangement of alkyl vinyl ethers has been illustrated using methyl vinyl ether as an example, the higher alkyl vinyl ethers can likewise be arranged by our process. For instance, if it is desired to make a compound containing 5 or 7 carbon atoms, the propyl and amyl vinyl ethers may be pyrolyzed as above described to give the respective compounds.

Therefore, it will be seen that we have described a new method of adding a carbon atom to a carbon chain. Our method is of great value for producing straight chain compounds with an odd number of carbon atoms. This is particularly advantageous because compounds having an odd number of carbon atoms do not occur with any degree of abundance in nature.

From the foregoing it is apparent that our invention is susceptible to some modification from the example set forth. Thus lower temperatures such as 300° C. can be used with low space velocities and high temperatures of the 900–1000° C. range can be used with very high space velocities. In the example the reaction was carried out as a straight pyrolysis reaction without the presence of a catalyst. However, catalyst or heat transfer materials which do not exert a detrimental influence on the reaction may be present.

The aldehydes produced by our process are of excellent quality and may be used for any of the various purposes that aldehydes are employed for. For example, the propionaldehyde produced in our proces may be converted to propionic acid.

Therefore, we do not wish to be restricted in our invention, excepting insofar as is necessitated by the prior art and the spirit of the appended claims.

What we claim is:

1. A process for the manufacture of lower alkyl aldehydes containing at least 3 carbon atoms, which comprises obtaining an alkyl vinyl ether having the corresponding number of carbon atoms in the molecule as the aldehyde to be produced, subjecting said ether to pyrolysis at a high space velocity above 1000 and a high temperature above 500° C. to cause the isomerization of the ether into the desired aldehyde.

2. A process for the manufacture of aliphatic aldehydes containing 3 to 7 carbon atoms, which comprises subjecting the corresponding lower alkyl vinyl ether to pyrolysis treatment at greater than 300° C. but less than 1000° C. and at a space velocity between 1000 and 25,000 such as to cause the migration of the alkyl group of part of the ether to form a saturated aldehyde and remove these from the reaction zone before extensive decomposition reactions take place the lower space velocities being employed with the lower temperatures.

3. A process for the manufacture of lower aliphatic aldehydes containing at least three carbon atoms, which comprises obtaining an alkyl vinyl ether containing the corresponding numbers of carbon atoms, subjecting the ether in the presence of a diluent to a temperature in excess of 400° C. and a space velocity between 1000 and 25,000 such that isomerization of part of the ether to the aldehyde of the corresponding number of carbon atoms occurs.

4. A process for the manufacture of lower aliphatic aldehydes containing at least 3 carbon atoms in the molecule, which comprises subjecting an alkyl vinyl ether containing at least 3 carbon atoms, to a pyrolysis at high temperatures above 500° C. and space velocities above 1000 in a pyrolysis chamber maintained under a partial vacuum.

5. A process for the manufacture of aliphatic aldehydes containing at least three carbon atoms in its molecule which comprises subjecting the corresponding lower alkyl vinyl ether to pyrolysis at temperatures over 500° C. and space velocities over 1000 high enough to prevent extensive decomposition of the ether and its aldehyde isomerization product and in the presence of a diluent.

6. A process for the manufacture of aliphatic aldehydes containing at least three carbon atoms in its molecule which comprises subjecting starting materials essentially comprising the corresponding lower alkyl vinyl ether and said secondary products to be referred to, to pyrolysis at temperatures over 400° C. and space velocities between 1000 and 25,000 high enough to prevent extensive decomposition of the ether or its aldehyde isomerization product and in the presence of secondary products of the type resulting from a pyrolysis reaction as aforementioned.

7. A process for the manufacture of aliphatic aldehydes containing at least 3 carbon atoms in its molecule, which comprises subjecting the corresponding lower alkyl vinyl ether and an inorganic diluent to pyrolysis at a temperature over 400° C. and at space velocities high enough to prevent extensive decomposition reactions of the ether and its aldehyde isomerization product, and under moderate pressures up to 300 lbs.

8. A process for the manufacture of aliphatic aldehydes containing 5–7 carbon atoms, which comprises subjecting the corresponding lower alkyl vinyl ether to pyrolysis treatment at a temperature greater than 400° C. and at a space velocity between 1000 and 25,000 permitting migration of the alkyl group of part of the ether and formation of a saturated aldehyde while minimizing decomposition reactions.

9. A process for the manufacture of an lower aliphatic aldehyde containing three carbon atoms, which comprises obtaining an alkyl vinyl ether containing the same number of carbon atoms by reacting acetylene and methanol in the liquid phase with alkali metal hydroxide as catalyst, subjecting the ether in the presence of a gaseous diluent to pyrolysis at a temperature above 300° C. and a space velocity between 1000 and 25,000 sufficient to cause isomerization of part of the ether to the aldehyde and yet minimize decomposition reactions.

10. The pyrolysis process which comprises subjecting at least one lower alkyl vinyl ether to heating at a temperature between 300° C.–1000° C. in a heating zone, said ethers being passed through said zone at a space velocity between 1000 and 25,000 high enough that less than one-third of said ether is converted to aldehyde per pass, recovering aldehyde formed, and recycling at least a part of the unreacted ether to the heating zone.

11. The pyrolysis process which comprises subjecting at least one lower alkyl vinyl ether to heating at a temperature between 500° C.–900° C. in a heating zone, said ether being passed through said zone at a space velocity between about 1,000 and 25,000.

RUDOLPH LEONARD HASCHE.
BENJAMIN THOMPSON.